(12) United States Patent
Kitamura

(10) Patent No.: US 8,717,329 B2
(45) Date of Patent: May 6, 2014

(54) TOUCH PANEL AND METHOD FOR OPERATING THE SAME, AND ELECTRONIC APPARATUS AND METHOD FOR OPERATING THE SAME

(75) Inventor: Ryota Kitamura, Miyagi (JP)

(73) Assignee: Sony Corporation, Tokyo (JP)

( * ) Notice: Subject to any disclaimer, the term of this patent is extended or adjusted under 35 U.S.C. 154(b) by 1256 days.

(21) Appl. No.: 12/509,982

(22) Filed: Jul. 27, 2009

(65) Prior Publication Data

US 2010/0026660 A1    Feb. 4, 2010

(30) Foreign Application Priority Data

Aug. 1, 2008  (JP) ................ 2008-199254

(51) Int. Cl.
| G06F 3/045 | (2006.01) |
| G06F 3/044 | (2006.01) |
| G06F 1/26 | (2006.01) |
| G06F 1/00 | (2006.01) |

(52) U.S. Cl.
USPC ........ 345/174; 345/173; 178/18.06; 713/320; 713/324

(58) Field of Classification Search
USPC ............... 345/173–174; 178/18.01–18.06; 713/320–340
See application file for complete search history.

(56) References Cited

U.S. PATENT DOCUMENTS

| 5,543,590 A * | 8/1996 | Gillespie et al. ........... 178/18.06 |
| 6,392,638 B2 * | 5/2002 | Hanajima et al. ............ 345/173 |
| 2007/0074914 A1 * | 4/2007 | Geaghan et al. .......... 178/18.06 |
| 2010/0045632 A1 * | 2/2010 | Yilmaz et al. ................ 345/174 |

FOREIGN PATENT DOCUMENTS

| JP | 2002-215314 | 8/2002 |
| JP | 2003-084904 | 3/2003 |
| JP | 2006-011568 | 1/2006 |
| JP | 2009-258903 | 11/2009 |

OTHER PUBLICATIONS

Japanese Patent Office Action corresponding to Japanese Serial No. 2008-199254 dated May 11, 2010.

* cited by examiner

*Primary Examiner* — Lun-Yi Lao
*Assistant Examiner* — Jarurat Suteerawongsa
(74) *Attorney, Agent, or Firm* — Dentons US LLP

(57) ABSTRACT

A touch panel includes n first line electrodes (n is an integer of 2 or greater) to which pulses are applied, m second line electrodes (m is an integer of 2 or greater) for use in detection, the second line electrodes being arranged to cross the first line electrodes, and a pulse generating circuit configured to apply pulses, in a selected order, to $n_1$ first line electrodes ($n_1$ is an integer of at least 1 and not greater than n) selected from among the n first line electrodes. A touched position on the touch panel is detected by detecting a change in capacitance between one of the first line electrodes and one of the second line electrodes.

20 Claims, 14 Drawing Sheets

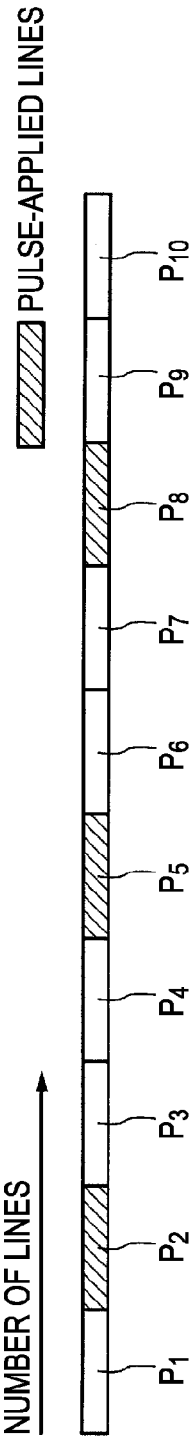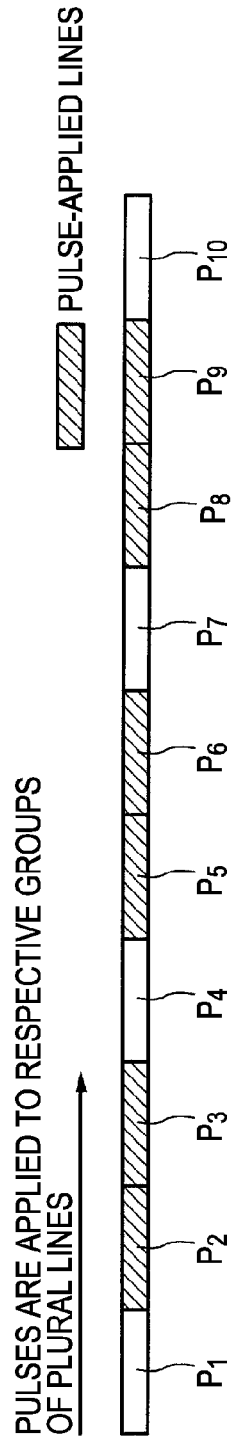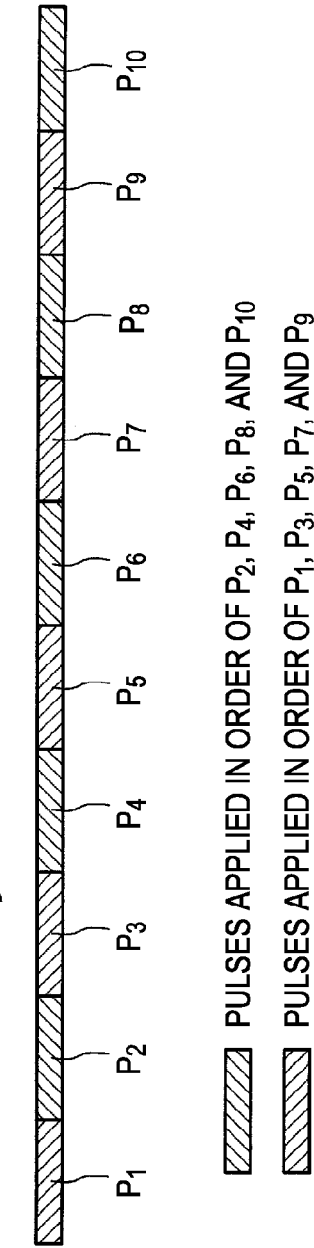

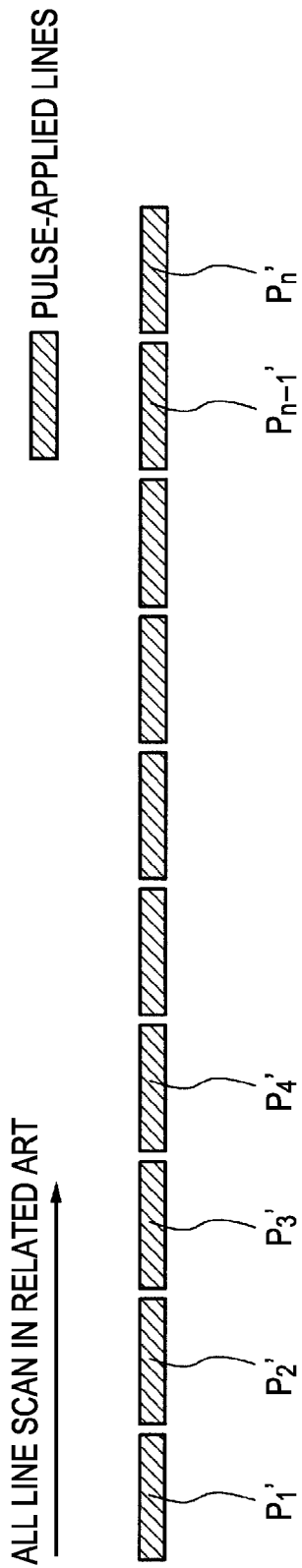

TOUCH PANEL AND METHOD FOR OPERATING THE SAME, AND ELECTRONIC APPARATUS AND METHOD FOR OPERATING THE SAME

BACKGROUND OF THE INVENTION

1. Field of the Invention

The present invention relates to a touch panel and a method for operating the touch panel, and an electronic apparatus and a method for operating the electronic apparatus. In particular, the present invention is suitably applied to electronic apparatuses having a touch panel as an input device.

2. Description of the Related Art

A touch panel, also called a touch screen, is an input device with which an operator operates an apparatus by touching the screen with a finger, which has been used in various electronic apparatuses.

There are various types of touch panels, including a capacitive type, a resistive film type, an ultrasonic type, an infrared type, and an electromagnetic induction type. While touch panels of the resistive film type have been widely used before, touch panels of the capacitive type have only recently attracted attention and enable multi-point detection that would be difficult with touch panels of the resistive film type.

A touch panel of the capacitive type may have a matrix structure, as illustrated in FIG. 11. Referring to FIG. 11, the touch panel includes a base substrate, and pulse lines $P_1'$ to $P_n'$ made up of n line electrodes and sense lines $S_1'$ to $S_m'$ made up of m line electrodes are arranged on the base substrate. The pulse lines $P_1'$ to $P_n'$ and the sense lines $S_1'$ to $S_m'$ are insulated from each other and arranged so as to cross each other. The pulse lines $P_1'$ to $P_n'$ are connected to a pulse generating circuit 101. The sense lines $S_1'$ to $S_m'$ are each connected to a corresponding detecting circuit.

In this touch panel of the related art, as shown in FIG. 12, the pulse generating circuit 101 applies predetermined pulses (voltage) to all the pulse lines $P_1'$ to $P_n'$ in turn, to carry out an "all line scan". When the panel surface is touched with a finger 102 of the operator, a change in capacitance between one of the pulse lines $P_1'$ to $P_n'$ and one of the sense lines $S_1'$ to $S_m'$ is detected by the detecting circuit, whereby the touched position is detected.

Meanwhile, a touch-type input device has been proposed (see Japanese Unexamined Patent Application Publication No. 2003-84904), which includes a first sheet and a second sheet, the first sheet including a plurality of first electrodes in strip form, a first resistance component connected to the first electrodes, and first wiring connected to the first resistance component, the second sheet including a plurality of second electrodes in strip form, a second resistance component connected to the second electrodes, and second wiring connected to the second resistance component, wherein the first sheet and the second sheet are arranged such that the first electrodes and the second electrodes substantially orthogonally cross each other, and the first electrodes and the second electrodes are each divided into groups of a plurality of lines. The input device further includes a control circuit, which specifies a group of the electrodes corresponding to a touched position, and further specifies the touched position within the group. This input device, however, is considerably different from the present invention in that it fails to have first line electrodes (pulse lines) to which pulses are applied and second line electrodes (sense lines) for use in detection which are arranged to cross the first line electrodes, and in that it is not of the capacitive type.

SUMMARY OF THE INVENTION

In the above-described touch panel of the related art, a double click operation or a slide operation can be recognized only when the all line scan of the pulse lines $P_1'$ to $P_n'$ is carried out twice to detect the states of a firstly touched position and a secondly touched position (whether they are at the same position or distant from each other). More specifically, for recognizing the double click operation, as shown in FIG. 13, it is necessary to conduct the all line scan twice and determine that the position detected first and the position detected second are approximately the same. For recognizing the slide operation, as shown in FIG. 14, it is necessary to conduct the all line scan twice and determine that the position detected first and the position detected second are different from each other.

As such, it is necessary to carry out the all line scan twice to recognize the double click operation or the slide operation, which takes too much time and may cause troubles in the operation. Specifically, in the case of conducting the all line scan of the pulse lines $P_1'$ to $P_n'$ as shown in FIG. 15, the detection time=(time for scanning one line)×(number of lines). For example in the case where the time for scanning one line is 1.3 ms and the number of lines n is 10, the detection takes a long time of: 1.3 (ms)×10 (lines)=13 ms/10 lines. The detection time becomes even longer as the number of lines n increases.

In view of the foregoing, there is a need for a touch panel which can detect, not only a double click operation, a slide operation, and a single click operation, but also a drag operation and other operations at high speed and with high accuracy, while consuming less power, and a method for operating the touch panel, and an electronic apparatus having such a touch panel and a method for operating the electronic apparatus.

The present inventors have carried out intensive studies to solve the above-described problems and achieved the present invention, as summarized below.

In the touch panel of the related art as shown in FIG. 11, the scanning speed may be increased so as to reduce the time necessary for carrying out the all line scan of the pulse lines $P_1'$ to $P_n'$. To this end, it may be conceivable to apply pulses to only a limited number of lines among the pulse lines $P_1'$ to $P_n'$. If the number of lines to which pulses are applied is restricted among the pulse lines $P_1'$ to $P_n'$, however, it may be difficult to ensure a sufficient accuracy in detecting touched positions that would be necessary for recognizing the drag operation.

If the operation speed of the pulse generating circuit 101 in itself is increased, the scanning speed which enables detection of two touched positions as described above in a short period of time may be realized, and the detection accuracy of the touched positions necessary for recognizing the drag operation may be achieved. Operating the pulse generating circuit 101 at high speed, however, may rather increase power consumption.

The present inventors have achieved the present invention by finding that the above-described problems can be solved by applying pulses in a selected order to a plurality of pulse lines selected from among the pulse lines $P_1'$ to $P_n'$ instead of applying pulses to every single line of the pulse lines $P_1'$ to $P_n'$ in turn constantly by the pulse generating circuit 101 as in the related art.

Specifically, according to a first embodiment of the present invention, there is provided a touch panel which includes: n first line electrodes (n is an integer of 2 or greater) to which pulses are applied; m second line electrodes (m is an integer of 2 or greater) for use in detection, the second line electrodes being arranged to cross the first line electrodes; and a pulse generating circuit configured to apply pulses in a selected order to $n_1$ first line electrodes ($n_1$ is an integer of at least 1 and not greater than n) selected from among the n first line electrodes; wherein a touched position on the touch panel is detected by detecting a change in capacitance between one of the first line electrodes and one of the second line electrodes.

Typically, the touch panel may be configured to be switchable between a first mode in which the pulses are applied to the $n_1$ first line electrodes ($1 \leq n_1 < n$), and a second mode in which the pulses are applied to the n first line electrodes. In a typical example, $n_1 = n/2$, i.e., the pulses are applied to a half of the n first line electrodes, although the number of lines to which pulses are applied is not limited thereto.

Typically, in the first mode, the pulses are applied to the selected $n_1$ first line electrodes ($n_1$ is an integer of at least 1 and not greater than n) in the order in which the first line electrodes are arranged. However, not limited thereto, the pulses may be applied to the first line electrodes in an arbitrary order. Further, the pulses may be applied to every certain ordinal number of first line electrodes, or may be applied to plural first line electrodes at a time. Still further, the first line electrode at which scanning is started may be shifted every time the all line scan is completed.

Typically, the touch panel operates in the first mode during normal standby, and in the case where a touch is detected twice within a predetermined time limit, if a position touched first and a position touched second are approximately the same, it is determined that a double click operation has been performed. With the touch panel operating in the first mode during standby, in the case where a touch is detected twice within a predetermined time limit, if a position touched first and a position touched second are distant from each other, it is determined that a slide operation has been performed. Further, with the touch panel operating in the first mode during standby, in the case where a touch is detected only once within a predetermined time limit, it is determined that a single click operation has been performed. In the case where a touch is detected only once within a predetermined time limit and if a duration of the touch detected exceeds the predetermined time limit, the touch panel is switched to the second mode to process a drag operation. The predetermined time limit may be determined in accordance with the operation speed of the operator or the like. The predetermined time limit may be fixed to a certain value, or may be set to any value as necessary. For example, the predetermined time limit may be set in accordance with the operator's age group. Typically, the n first line electrodes are arranged at equal spacings, and the m second line electrodes are also arranged at equal spacings, although the configurations are not restricted thereto. Further, the n first line electrodes may have widths identical to or different from each other. Furthermore, the spacings between any two of the n first line electrodes may vary.

According to a second embodiment of the present invention, there is provided a method for operating a touch panel, the touch panel including n first line electrodes (n is an integer of 2 or greater) to which pulses are applied and m second line electrodes (m is an integer of 2 or greater) for use in detection, the second line electrodes being arranged to cross the first line electrodes, and configured to detect a touched position on the touch panel by detecting a change in capacitance between one of the first line electrodes and one of the second line electrodes, wherein the method includes the step of: applying pulses, in a selected order, to $n_1$ first line electrodes ($n_1$ is an integer of at least 1 and not greater than n) selected from among the n first line electrodes.

According to a third embodiment of the present invention, there is provided an electronic apparatus including a touch panel, wherein the touch panel includes: n first line electrodes (n is an integer of 2 or greater) to which pulses are applied; m second line electrodes (m is an integer of 2 or greater) for use in detection, the second line electrodes being arranged to cross the first line electrodes; and a pulse generating circuit configured to apply pulses in a selected order to $n_1$ first line electrodes ($n_1$ is an integer of at least 1 and not greater than n) selected from among the n first line electrodes; and wherein a touched position on the touch panel is detected by detecting a change in capacitance between one of the first line electrodes and one of the second line electrodes.

According to a fourth embodiment of the present invention, there is provided a method for operating an electronic apparatus including a touch panel, the touch panel including n first line electrodes (n is an integer of 2 or greater) to which pulses are applied and m second line electrodes (m is an integer of 2 or greater) for use in detection, the second line electrodes being arranged to cross the first line electrodes, and configured to detect a touched position on the touch panel by detecting a change in capacitance between one of the first line electrodes and one of the second line electrodes, wherein the method includes the step of: applying pulses, in a selected order, to $n_1$ first line electrodes ($n_1$ is an integer of at least 1 and not greater than n) selected from among the n first line electrodes.

In the second through fourth embodiments of the present invention described above, what is described in conjunction with the first embodiment of present invention applies as long as it does not contradict their properties.

In the third and fourth embodiments of the present invention described above, the electronic apparatus may basically be of any type, whether portable or stationary. Specific examples of the electronic apparatus may include: portable telephones, mobile apparatuses (including personal digital assistant (PDA)), digital cameras, car navigation systems, game machines, personal computers, displays (including liquid crystal display, organic EL display, plasma display), robots, vehicle-mounted apparatuses, home electric appliances, and industrial products.

According to the above-described embodiments of the present invention, pulses are applied in a selected order to $n_1$ first line electrodes ($n_1$ is an integer of at least 1 and not greater than n) selected from among n first line electrodes. For example, in a normal standby mode, pulses are applied only to a number smaller than n of the first line electrodes, to detect a double click operation, a slide operation, and a single click operation. Only in the case of detecting a specific operation, such as a drag operation, for which high-precision position detection is necessary, are pulses applied to all the n first line electrodes to detect the operation with high accuracy. It is unnecessary to consistently apply pulses to the n first line electrodes to carry out an all line scan. Therefore, it is unnecessary to increase the operation speed of the pulse generating circuit, and the consumed power can be kept low. Furthermore, this excellent touch panel can be used to implement electronic apparatuses excellent in operability.

BRIEF DESCRIPTION OF THE DRAWINGS

FIGS. 8A, 8B, and 8C are schematic diagrams illustrating methods for applying pulses to the touch panels according to second, third, and fourth embodiments, respectively, of the present invention;

FIG. 15 is a schematic diagram illustrating the all line scan performed on the touch panel of the related art.

DESCRIPTION OF THE PREFERRED EMBODIMENTS

Figure 1:
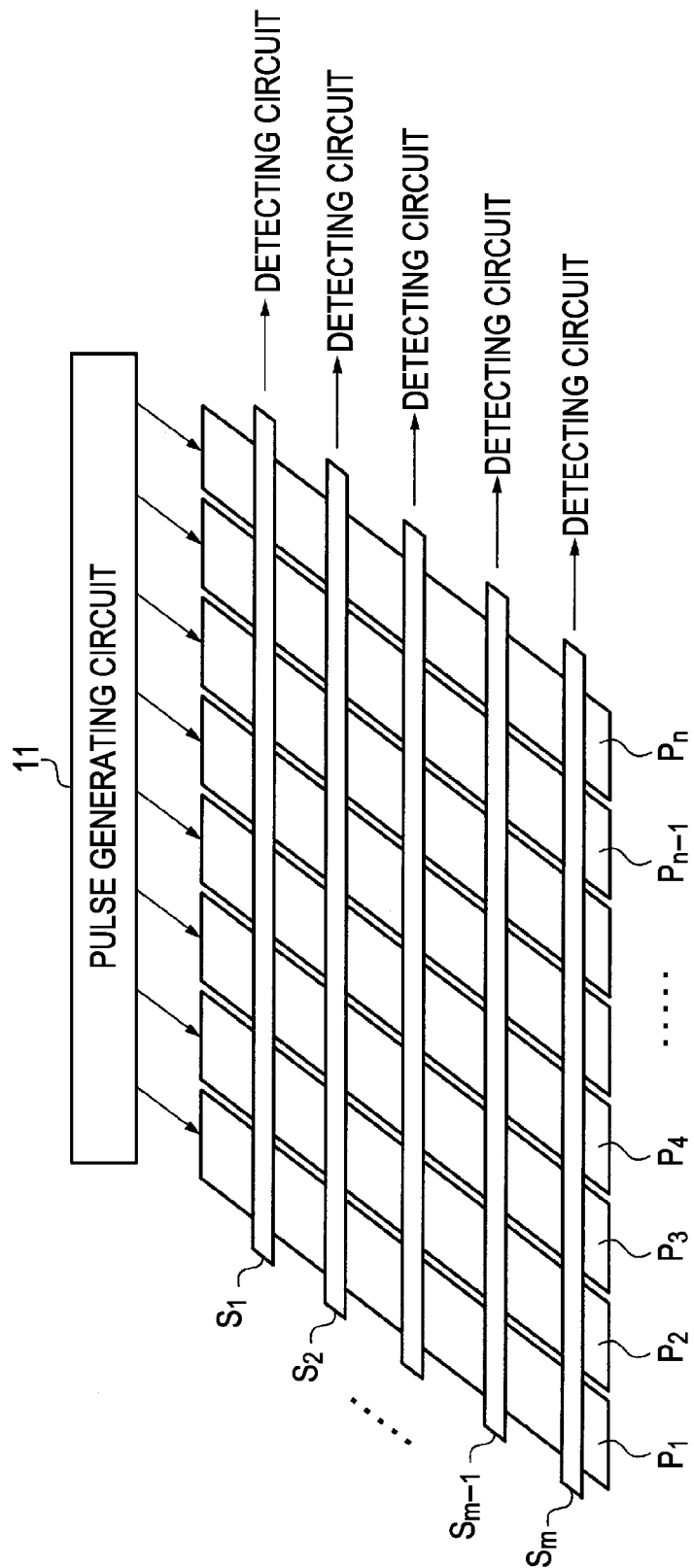
FIG. 1 is a schematic diagram of a touch panel according to a first embodiment of the present invention.

Hereinafter, embodiments of the present invention will be described with reference to the drawings. Throughout the drawings, like reference characters denote like or corresponding portions.

A capacitive type touch panel according to a first embodiment of the present invention will now be described.

Referring to FIG. 1 which shows the touch panel of the first embodiment, the touch panel includes pulse lines $P_1$ to $P_n$, which are constituted by n line electrodes (n is an integer of 2 or greater), and sense lines $S_1$ to $S_m$, which are constituted by m line electrodes (m is an integer of 2 or greater). The pulse lines and the sense lines are insulated from each other and provided to orthogonally cross each other to form a matrix structure. In the present embodiment, the pulse lines $P_1$ to $P_n$ are arranged in parallel and at equal spacings. Here, the number n of the pulse lines $P_1$ to $P_n$ is an even number. Similarly, the sense lines $S_1$ to $S_m$ are arranged in parallel and at equal spacings. The number n, length, width, and spacing between the pulse lines $P_1$ to $P_n$, as well as the number m, length, width, and spacing between the sense lines $S_1$ to $S_m$ may be determined as appropriate according to the application of the touch panel, the size of the area to be touched, and the like.

The pulse lines $P_1$ to $P_n$ are connected to a pulse generating circuit 11. The pulse generating circuit 11 is configured so as to be capable of applying pulses, in a selected order, to $n_1$ pulse lines ($n_1$ is an integer of at least 1 and not greater than n) selected from among the pulse lines $P_1$ to $P_n$. The sense lines $S_1$ to $S_m$ are each connected to the corresponding detecting circuit.

Figure 2:
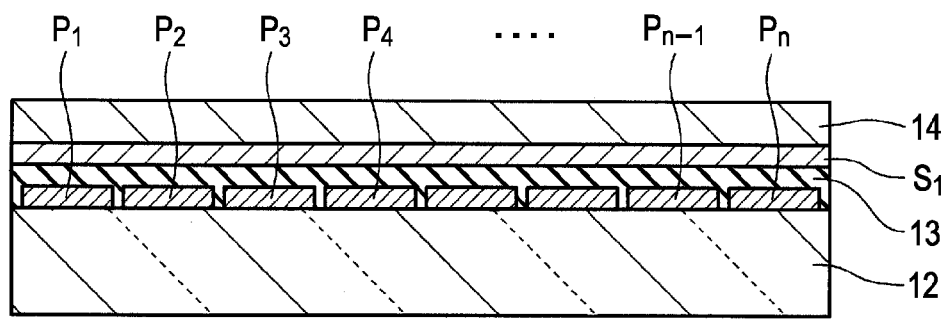
FIG. 2 is a cross-sectional view of the touch panel according to the first embodiment of the present invention.

FIG. 2 shows by way of example a cross-sectional structure taken along the sense lines $S_1$ to $S_m$, here the sense line $S_1$, of the touch panel. Referring to FIG. 2, the pulse lines $P_1$ to $P_n$ are provided on a base substrate 12 such as a transparent substrate or a transparent film. An insulating layer 13 is provided to cover the pulse lines $P_1$ to $P_n$, and the sense lines $S_1$ to $S_m$ are provided on the insulating layer 13. A protective layer 14 is then provided to cover the sense lines $S_1$ to $S_m$.

Figure 3:
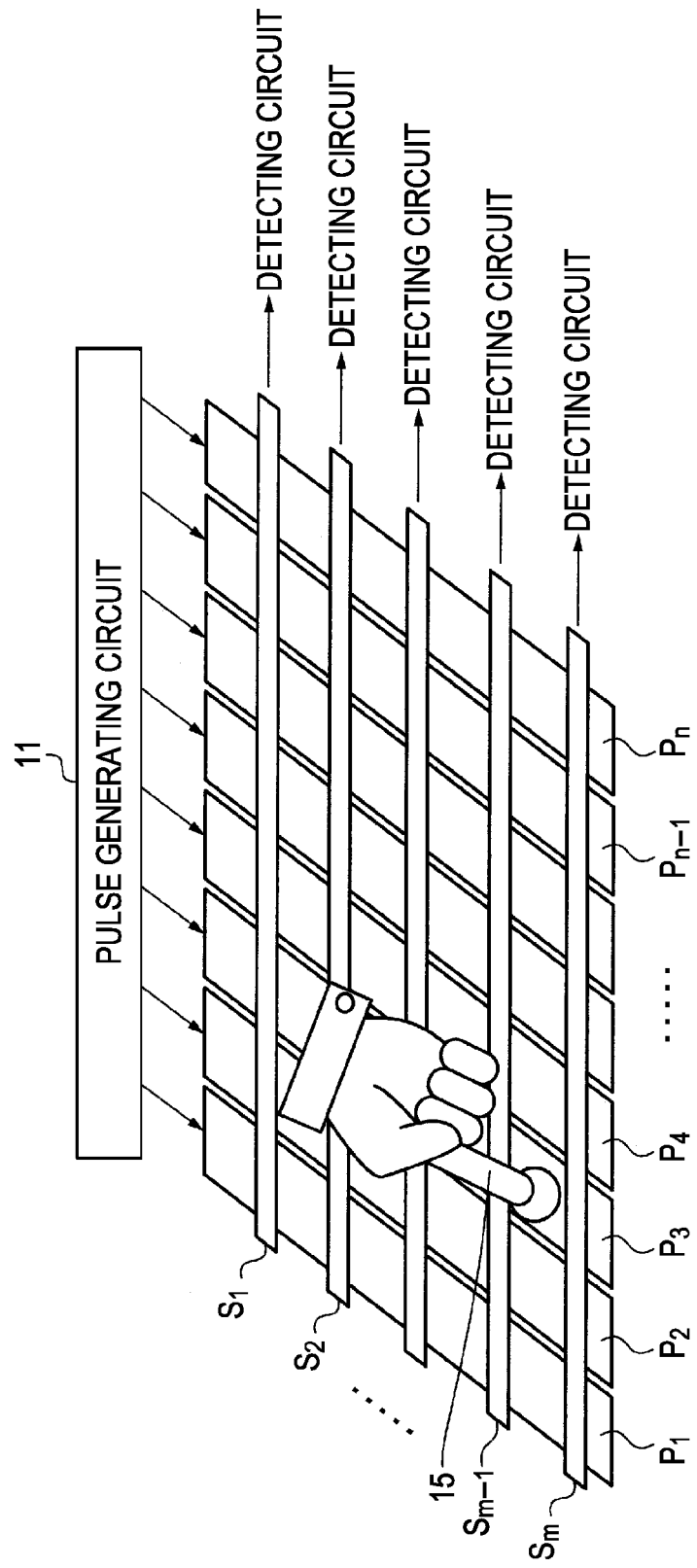
FIG. 3 is a schematic diagram illustrating a method for detecting a touched position on the touch panel according to the first embodiment of the present invention.

In this touch panel, as shown in FIG. 3, the pulse generating circuit 11 applies pulses, in a selected order, to the $n_1$ pulse lines ($n_1$ is an integer of at least 1 and not greater than n) selected from among the pulse lines $P_1$ to $P_n$. When the panel surface is touched with a finger 15 of the operator, a change in capacitance between one of the pulse lines $P_1$ to $P_n$ and one of the sense lines $S_1$ to $S_m$ is detected by the detecting circuit connected to that sense line, and thus, the touched position is detected.

In this touch panel, in a normal standby mode, the pulse generating circuit 11 applies the pulses (voltage), not to all the pulse lines $P_1$ to $P_n$ in turn as in the related art, but to every other pulse line of the pulse lines $P_1$ to $P_n$, for example to the even-numbered pulse lines, for scanning. Hereinafter, the mode in which pulses are applied to every other pulse line among the pulse lines $P_1$ to $P_n$ will be called a "half mode", while the mode in which pulses are applied to all the pulse lines $P_1$ to $P_n$ in turn as in the related art will be called a "full mode". As will be described below in detail, the double click operation, the slide operation, and the single click operation are detected in the half mode, while the drag operation is detected in the full mode.

Figure 4:
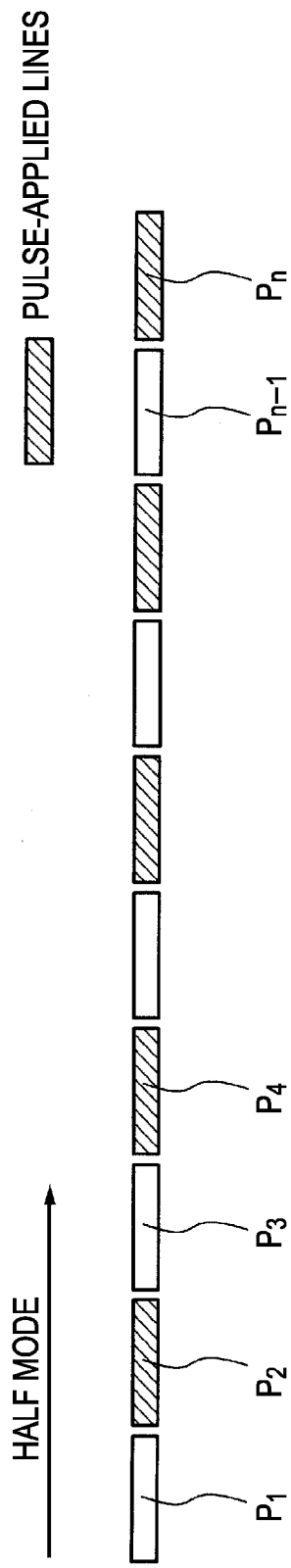
FIG. 4 is a schematic diagram illustrating a method for applying pulses to the touch panel according to the first embodiment of the present invention.

In the half mode, the number of pulse lines to which the pulses are applied is halved compared to that in the full mode. This means that the all line scan can be performed twice by scanning every other pulse line of the pulse lines $P_1$ to $P_n$ within the time that would be necessary for performing the all line scan of the pulse lines $P_1$ to $P_n$ once in the full mode, whereby touched position detection can be performed twice within the same time. That is, as shown in FIG. 4, with the detection time=(time for scanning one line)×(n/2), the all line scan can be carried out twice within the time taken to conduct the all line scan once in the related art. More specifically, assuming that the scanning speed is 1.3 ms/line, for example, the detection time is obtained by 1.3 (ms)×5 (lines)=6.5 ms/10 lines, and accordingly, the detection time can be halved compared with the case of conducting the all line scan by applying pulses to all the pulse lines as illustrated in FIG. 15.

A method for operating the touch panel will now be described with reference to FIG. 5, which illustrates by way of example the flow of the operation. This operation is carried out by an MPU, which will be described later, as the MPU controls a touch panel circuit made up of the pulse generating circuit 11, the detecting circuits, and others.

Figure 5:
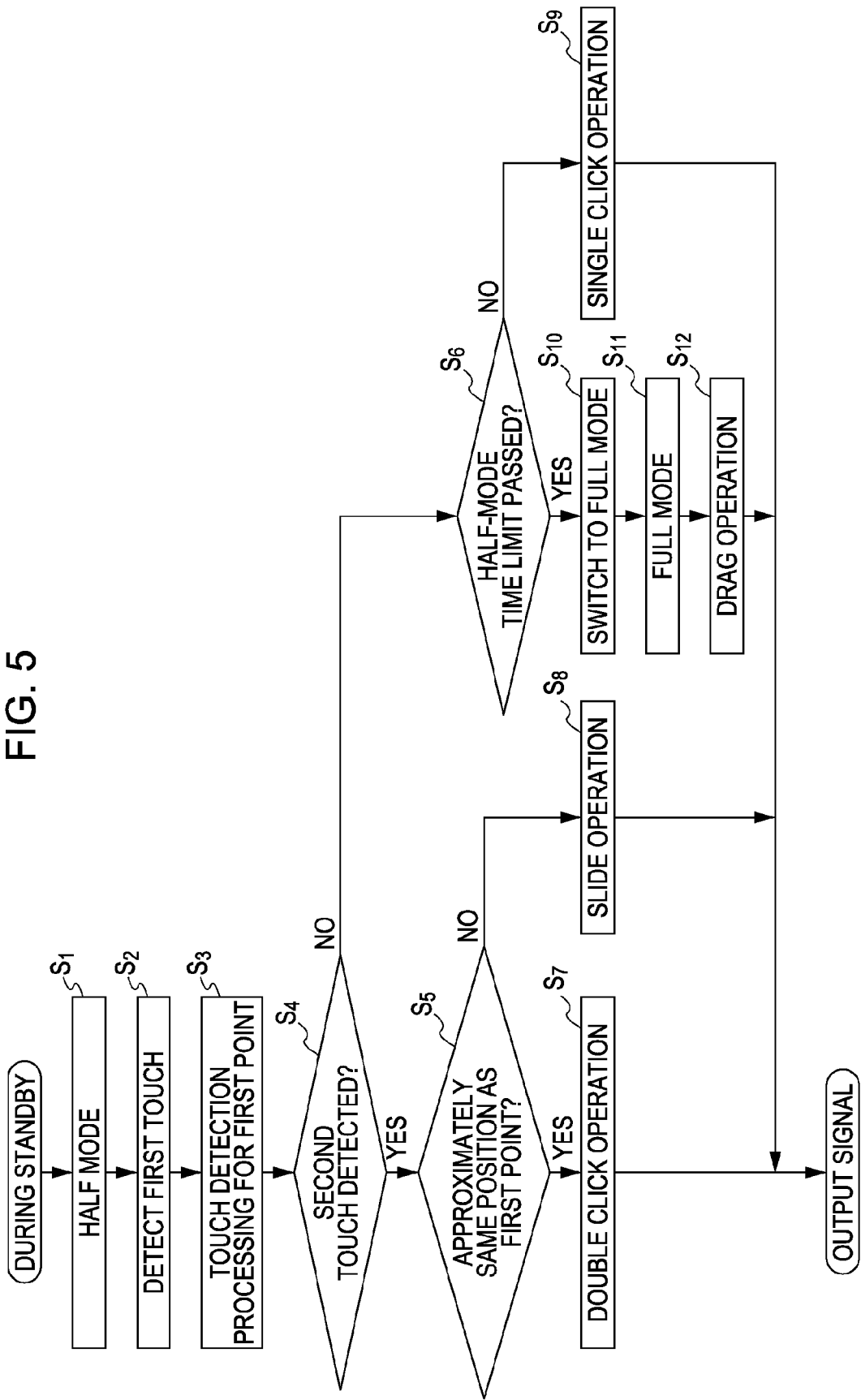
FIG. 5 is a flowchart illustrating a method for operating the touch panel according to the first embodiment of the present invention.

Referring to FIG. 5, during standby, the touch panel is set to the half mode (step $S_1$).

When a first touch is detected (step $S_2$), touch detection processing for the first point is performed to detect the touched position (step $S_3$).

Next, it is determined whether a second touch has been detected (step $S_4$).

If it is determined that a second touch has been detected, it is then determined whether the secondly touched position is approximately the same as the firstly touched position (step $S_5$). Meanwhile, a time limit from after detection of the first touch, i.e. a half-mode time limit, is preset. At this time, it is also determined whether the second touch was detected within the half-mode time limit (step $S_6$). The half-mode time limit may be determined as appropriate in accordance with the operator's age group and the like. For example, with the operator operating at a high speed, it will take about 20-30 ms, for example, to detect a single position touched, and thus, the half-mode time limit is preset, e.g., to 50-60 ms. With the operator operating at a low speed, it will take about 70-100 ms, for example, to detect a single position touched, and thus, the half-mode time limit is preset, e.g., to 120-150 ms.

When the second touch is detected within the half-mode time limit and if the secondly detected position is approximately the same as the firstly detected position, then the operation is recognized as a double click operation (step $S_7$).

If the secondly detected position is not approximately the same as the firstly detected position, then the operation is recognized as a slide operation (step $S_8$).

In the case where it is determined that a second touch has not been detected, if the duration of the first touch detected is within the half-mode time limit, the operation is recognized as a single click operation (step $S_9$).

On the other hand, if the duration of the first touch detected exceeds the half-mode time limit, the touch panel is switched from the half mode to the full mode in preparation for a drag operation (step $S_{10}$). The operation is then recognized as the drag operation in the full mode (steps $S_{11}$ and $S_{12}$).

In the full mode, although the time necessary for the all line scan is double that in the half mode, every single line of the pulse lines $P_1$ to $P_n$ is scanned, which ensures a sufficient level of accuracy in detecting the touched positions that would be necessary for detecting the drag operation.

Figure 6:
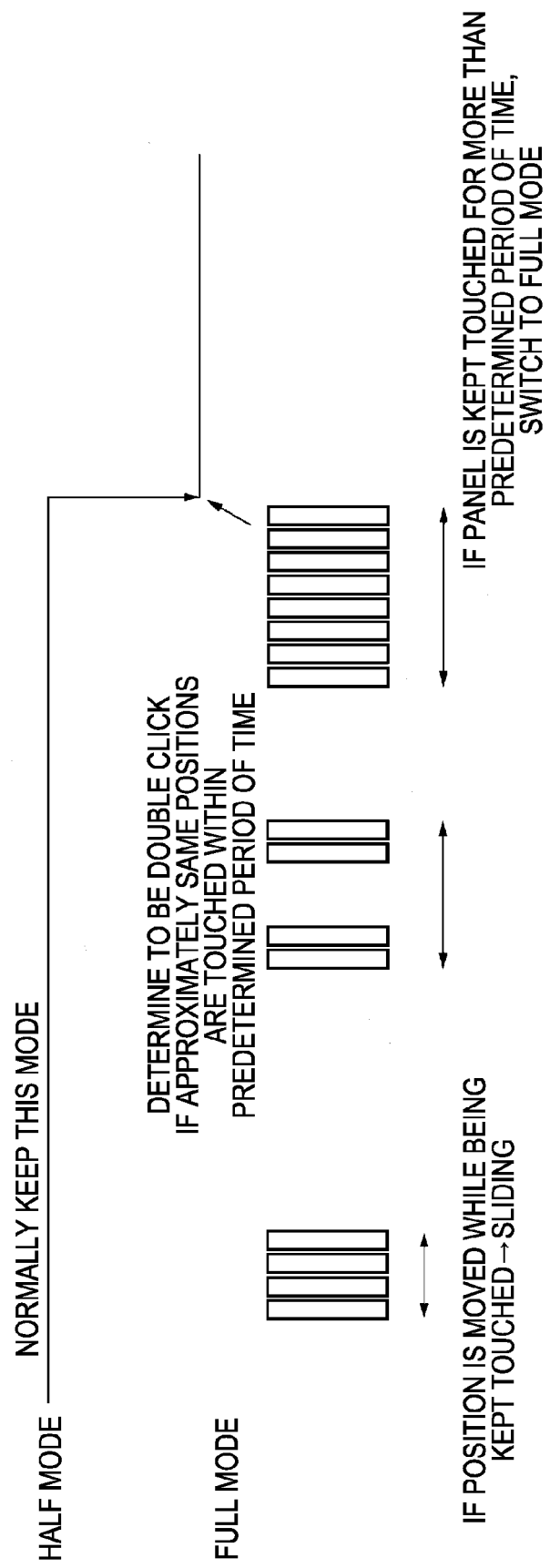
FIG. 6 is a schematic diagram illustrating the method for operating the touch panel according to the first embodiment of the present invention.

FIG. 6 schematically illustrates the operations in steps $S_7$ and $S_8$ in the half mode as well as the transition from the half mode to the full mode.

The result of detection obtained through any of the above-described processes is externally output from an output terminal of the touch panel. The signal is used for an operation of an electronic apparatus on which the touch panel has been mounted as an input device, and the electronic apparatus performs processing corresponding to the signal.

An example of the circuit configuration of the touch panel will now be described with reference to FIG. 7.

Figure 7:
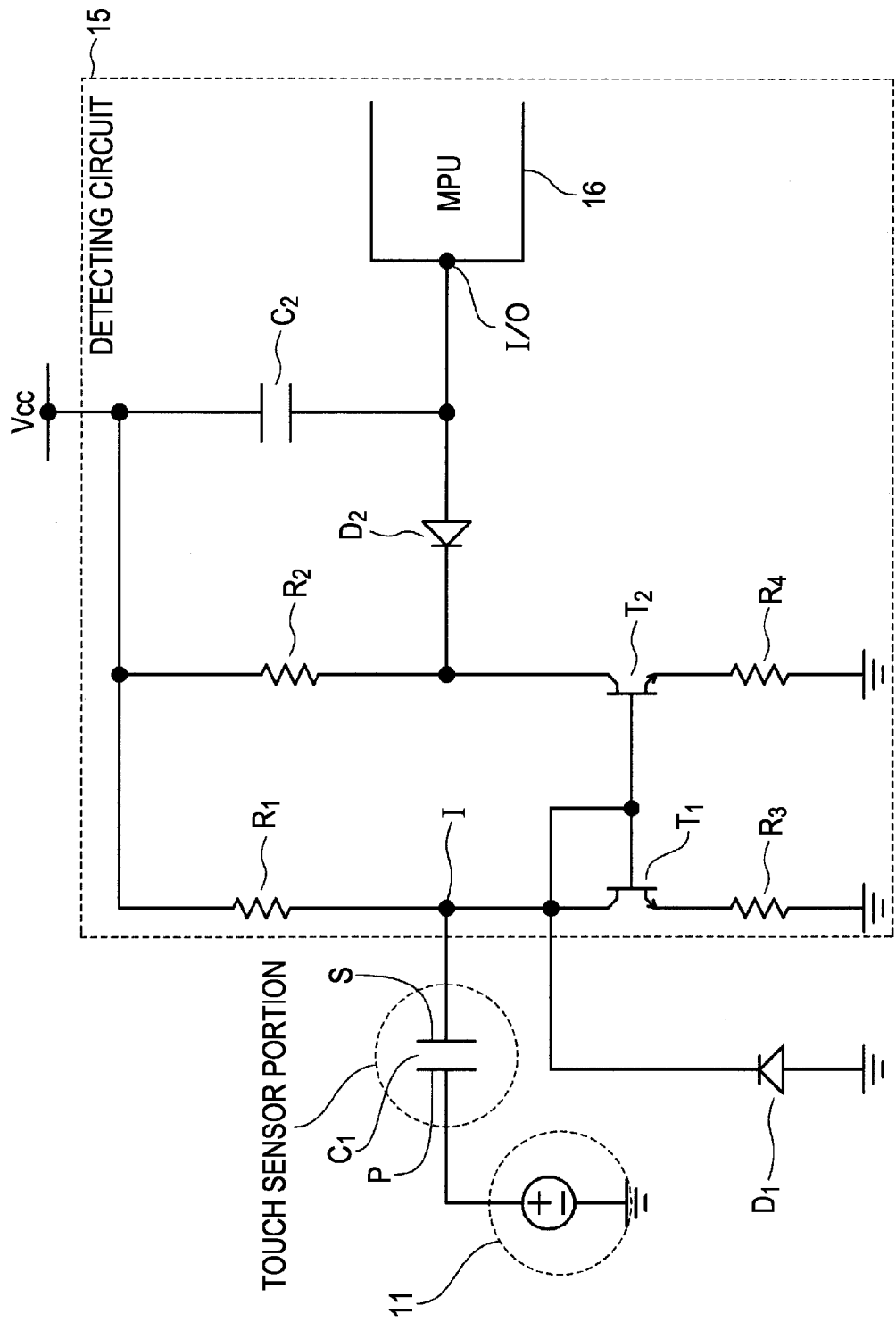
FIG. 7 is a schematic diagram showing an example of the circuit configuration of the touch panel according to the first embodiment of the present invention.

Referring to FIG. 7, a capacitance $C_1$ is formed between a pulse line P (any of the pulse lines $P_1$ to $P_n$) and a sense line S (any of the sense lines $S_1$ to $S_m$). The pulse line P is connected to the pulse generating circuit 11, and the pulse generating circuit 11 selects the pulse line. The sense line S is connected to an input terminal I of a detecting circuit 15.

In the detecting circuit 15, transistors $T_1$ and $T_2$, resistors $R_1$ and $R_2$, and resistors $R_3$ and $R_4$ constitute a current mirror circuit, wherein the transistor $T_1$ has a base and a collector short-circuited, the transistor $T_2$ has a base connected to the base of the transistor $T_1$, the resistors $R_1$ and $R_2$ are each connected in series between the collector of the corresponding transistor $T_1$, $T_2$ and a power source supplying a power supply voltage $V_{cc}$, and the resistors $R_3$ and $R_4$ are each connected to the emitter of the corresponding transistor $T_1$, $T_2$. The transistors $T_1$ and $T_2$ have identical properties. The resistors $R_3$ and $R_4$ each have one end grounded. Further, the collector of the transistor $T_1$ is connected to a cathode of a protection diode $D_1$. The protection diode $D_1$ has its anode grounded. A capacitance $C_2$ and a diode $D_2$ are connected in parallel with the resistor $R_2$ between the collector of the transistor $T_2$ and the power source supplying the power supply voltage $V_{cc}$. The diode $D_2$ has its anode connected to an input/output terminal I/O of an MPU 16.

The MPU 16 controls overall operations of the touch panel. Specifically, the MPU 16 controls application of the pulses to the pulse lines $P_1$ to $P_n$ by the pulse generating circuit 11, detection of the touched positions on the touch panel by the detecting circuits 15, and others.

Hereinafter, an operation of the touch panel circuit shown in FIG. 7 will be described.

During the half mode operation, when a pulse is applied to one of the pulse lines $P_1$ to $P_n$, the pulse line attains a predetermined positive potential. If a position touched falls on this pulse line, the capacitance $C_1$ provided between this pulse line and the sense line located near the touched position undergoes a change in capacitance. As a result, the potential of the collector of the transistor $T_1$ changes, and correspondingly, the current flowing through the transistor $T_1$ and, hence, the current flowing through the transistor $T_2$ change. Then, the potential of the terminal of the capacitance $C_2$ provided on the diode $D_2$ side changes, and the MPU 16 detects this change in potential. This indicates on which pulse line and between which sense lines the touched position is located, thereby enabling detection of the touched position.

As described above, the touch panel according to the first embodiment of the present invention can be switched between the half mode, in which pulses are applied to every other line of the pulse lines $P_1$ to $P_n$ for scanning, and the full mode, in which pulses are applied to all the pulse lines $P_1$ to $P_n$ in turn. In a normal standby mode, the touch panel is operated in the half mode to perform scanning by applying pulses to every other line of the pulse lines $P_1$ to $P_n$, and thus, the touched state can be detected in half the time that would be necessary in the case of the full mode where the pulses are applied to all the pulse lines $P_1$ to $P_n$ in turn. The double click operation, the slide operation, and the single click operation can be detected reliably in the half mode. In the half mode, scanning is performed on only half of the pulse lines $P_1$ to $P_n$, which may lead to a lower accuracy in positional detection than in the case of scanning all the pulse lines $P_1$ to $P_n$. However, it does not matter, because the half mode can assure the detection accuracy of a practically sufficient level, and furthermore, it can accurately detect the operating conditions which are most important for the double click operation and the slide operation. When the mode is switched from the half mode to the full mode, accuracy in positional detection which is necessary for the drag operation can also be ensured. Furthermore, because the touch panel is operated in the half mode during standby, the power consumed by the pulse generating circuit 11 can be reduced even if a scanning speed equivalent to that in the related art is maintained. In the half mode during standby, when the scanning speed is set to the same speed as in the all line scan in the full mode, spare time is produced during the scan time (at an interval between the time when a pulse is applied to one pulse line and the time when another pulse is applied to the next pulse line, or after predetermined line scanning is completed). During such spare time, the operation of the pulse generating circuit 11 can be stopped, whereby the power consumed by the touch panel can be reduced.

A touch panel according to a second embodiment of the present invention will now be described.

This touch panel is configured such that, during standby, pulses are applied to every certain ordinal number of lines among the pulse lines $P_1$ to $P_n$. For example, in the example shown in FIG. 8A, pulses are applied to the pulse lines $P_2$, $P_5$, and $P_8$. Otherwise, the touch panel of the second embodiment is identical to that of the first embodiment.

According to the second embodiment, effects similar to those in the first embodiment can be obtained.

A touch panel according to a third embodiment of the present invention will now be described.

This touch panel is configured such that, during standby, a plurality of pulse lines among the pulse lines $P_1$ to $P_n$ are made into a group and pulses are applied to respective ones of such groups. For example, in the example shown in FIG. 8B, the pulse lines $P_2$ and $P_3$, the pulse lines $P_5$ and $P_6$, and the pulse lines $P_8$ and $P_9$ are made into groups, and the pulses are applied to the respective groups. Otherwise, the touch panel of the third embodiment is identical to that of the first embodiment.

According to the third embodiment, effects similar to those in the first embodiment can be obtained. In addition, as a plurality of pulse lines among the pulse lines $P_1$ to $P_n$ are made into a group and a pulse is applied to that group, effects comparable to those which would be obtained by a wider pulse line can be obtained. For example, a touch on the panel can be detected more easily.

A touch panel according to a fourth embodiment of the present invention will now be described.

This touch panel is configured such that, during standby, pulses are applied to every other line of the pulse lines $P_1$ to $P_n$, with the pulse line to which a pulse is firstly applied being shifted every time the all line scan is newly started. For example, in the example shown in FIG. 8C, scanning is performed by applying pulses to the pulse lines $P_2$, $P_4$, $P_6$, $P_8$, and $P_{10}$ in this order, and then scanning is performed again by applying pulses to the pulse lines $P_1$, $P_3$, $P_5$, $P_7$, and $P_9$ in this order. Otherwise, the touch panel of the fourth embodiment is identical to that of the first embodiment.

According to the fourth embodiment, effects similar to those in the first embodiment can be obtained. Furthermore, this configuration can easily detect touched positions even in the case where the touched positions change irregularly.

A touch panel according to a fifth embodiment of the present invention will now be described.

Figure 9:
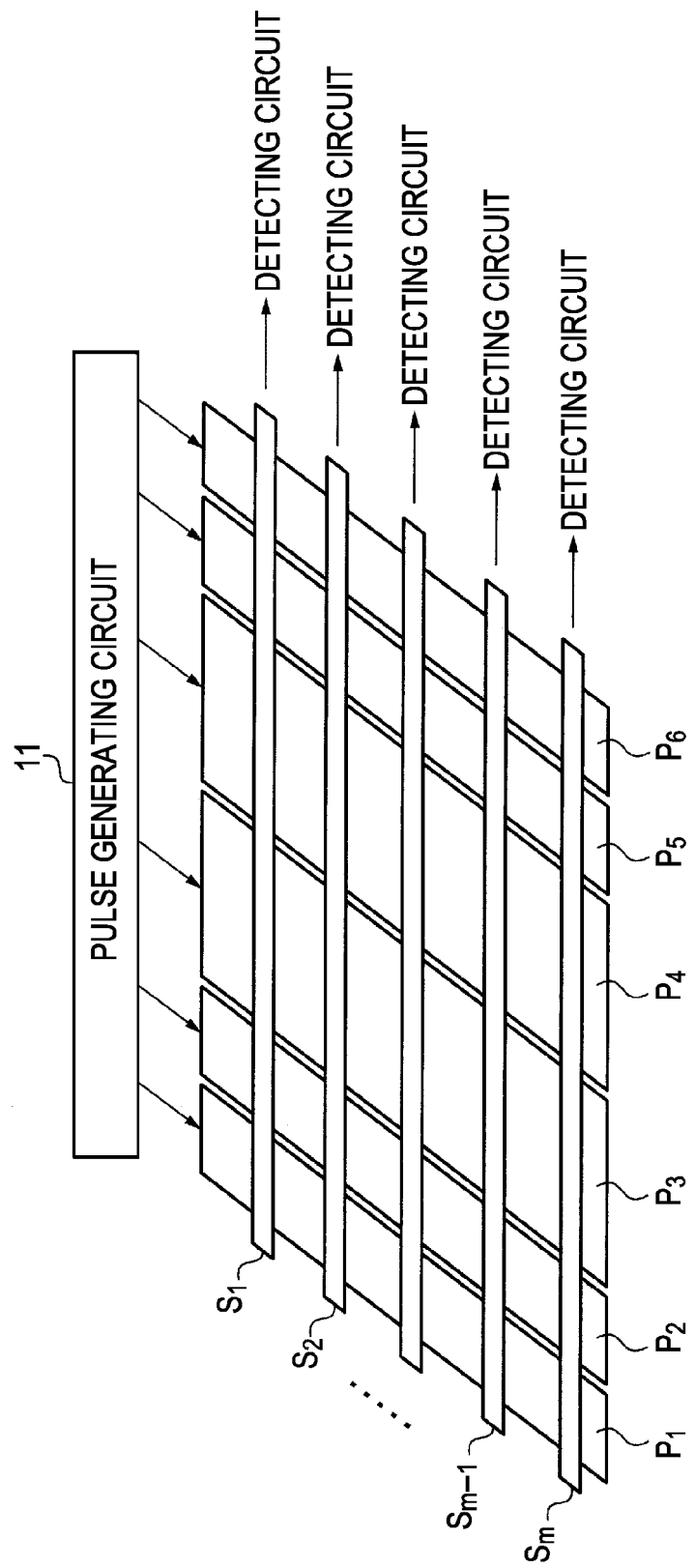
FIG. 9 is a schematic diagram illustrating a touch panel according to a fifth embodiment of the present invention.

In this touch panel, some of the pulse lines $P_1$ to $P_n$ have widths different from those of the other pulse lines. For example, in the example shown in FIG. 9, two pulse lines $P_3$ and $P_4$ located in the middle of the pulse lines $P_1$ to $P_6$ each have the width twice the width of the other pulse lines $P_1$, $P_2$, $P_5$, and $P_6$. Otherwise, the touch panel of the fifth embodiment is identical to that of the first embodiment.

According to the fifth embodiment, effects similar to those in the first embodiment can be obtained. In addition, a touch can be detected more easily on the pulse lines $P_3$ and $P_4$ which are wider than the other lines among the pulse lines $P_1$ to $P_6$, i.e., at the center of the touch panel in the direction in which the pulse lines $P_1$ to $P_6$ are arranged.

A touch panel according to a sixth embodiment of the present invention will now be described.

Figure 10:
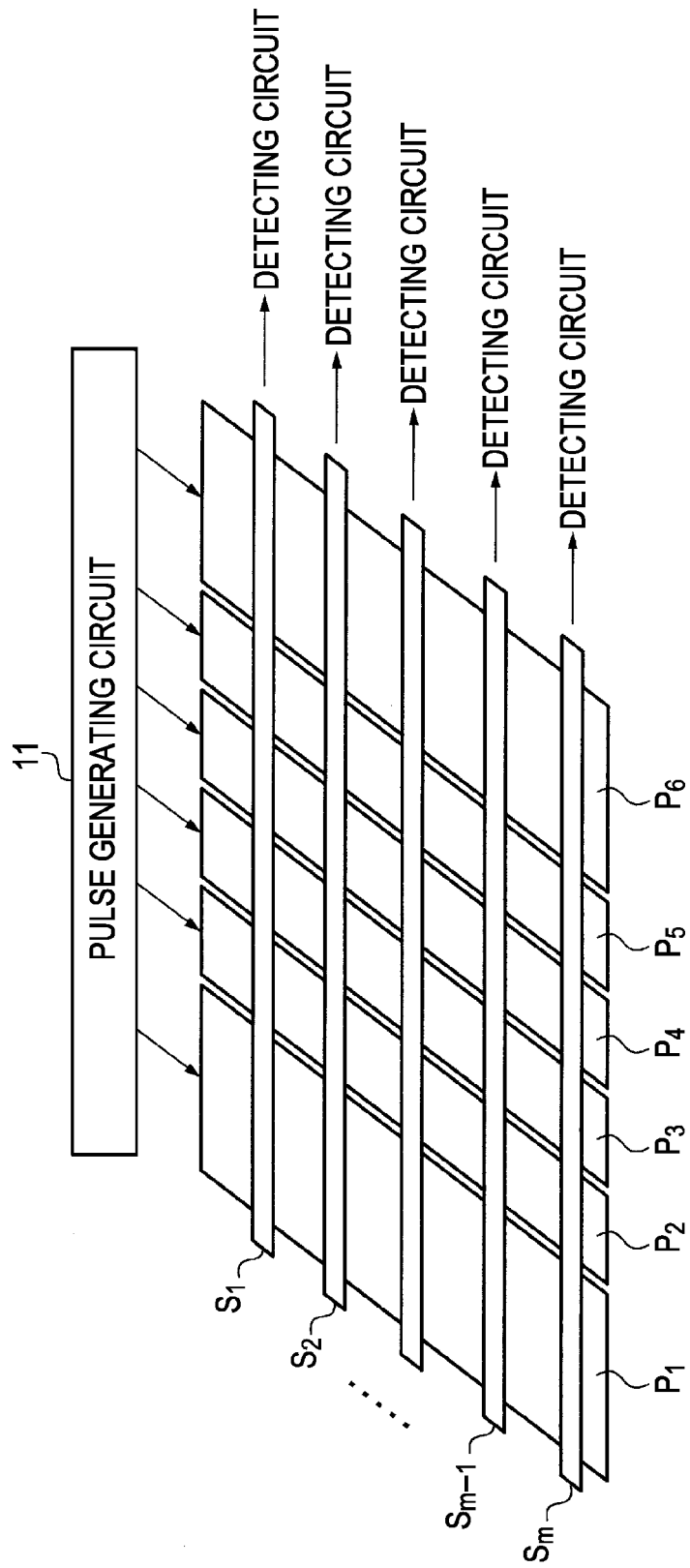
FIG. 10 is a schematic diagram illustrating a touch panel according to a sixth embodiment of the present invention.
Figure 11:
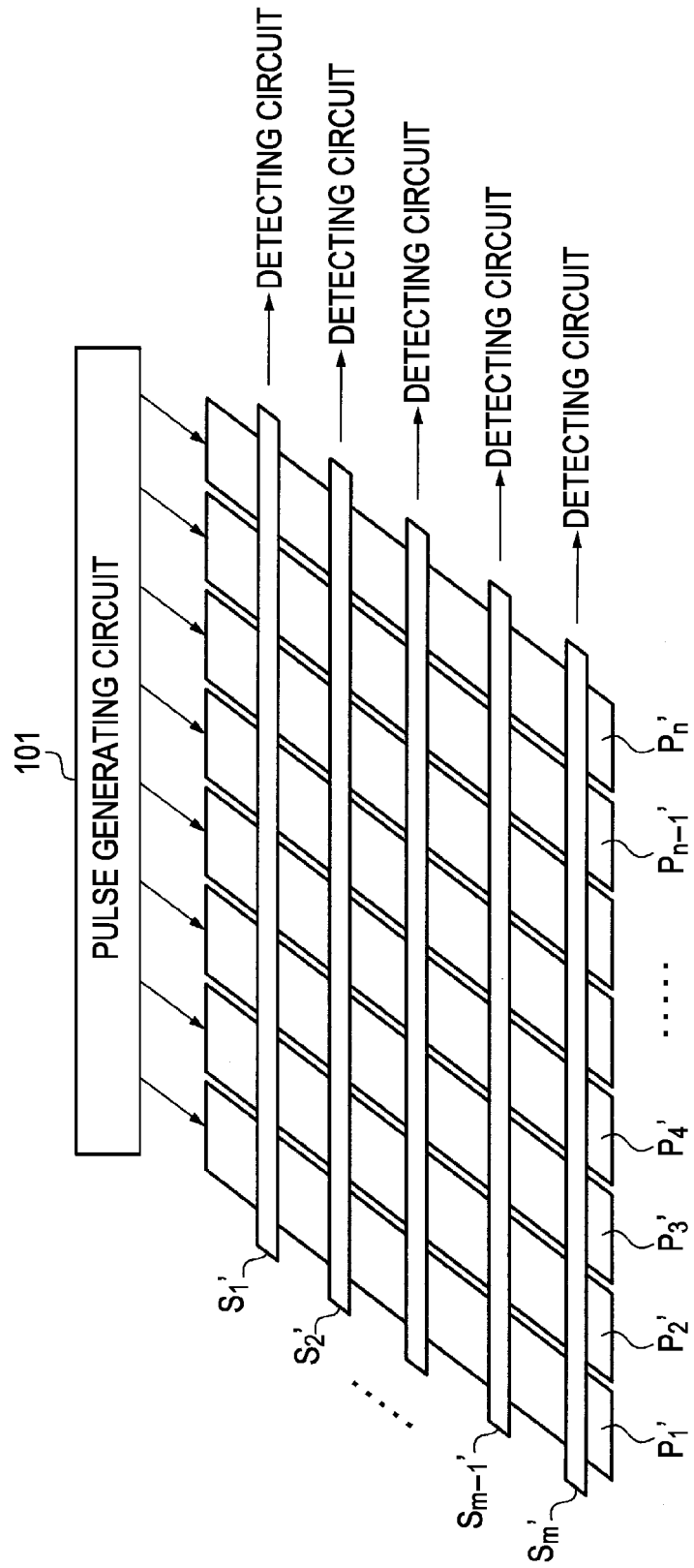
FIG. 11 is a schematic diagram illustrating a touch panel of the related art.
Figure 12:
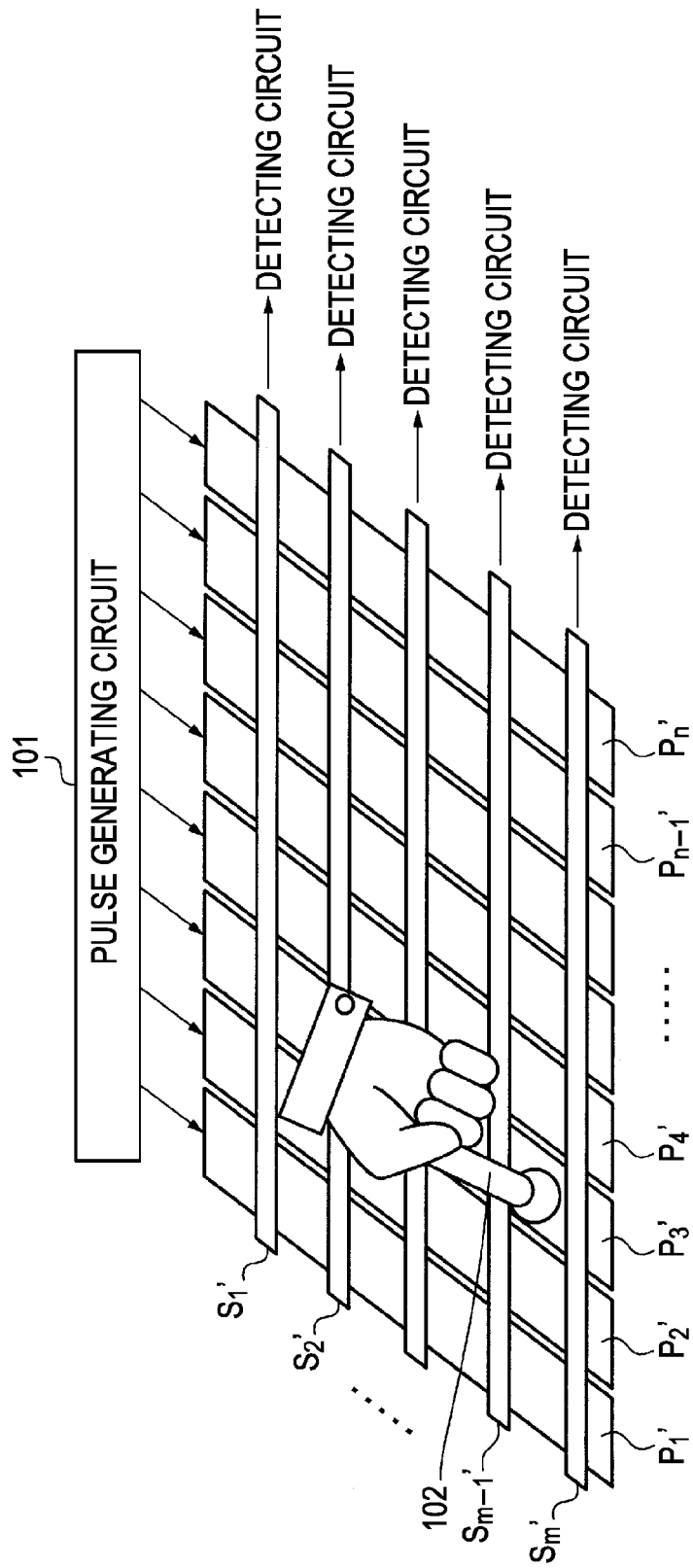
FIG. 12 is a schematic diagram illustrating a method for detecting a touched position on the touch panel of the related art.
Figure 13:
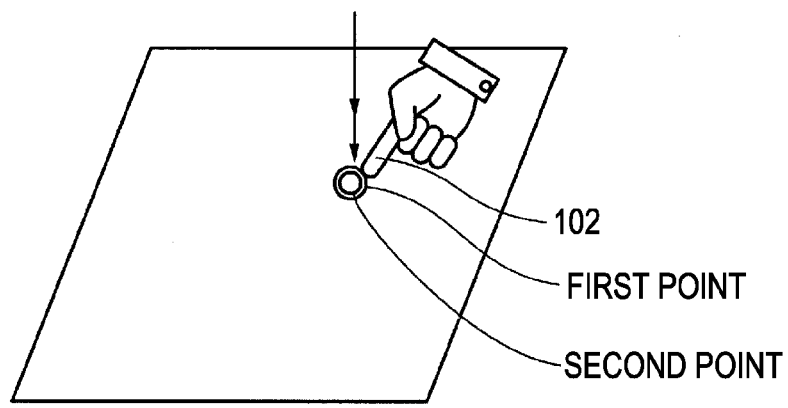
FIG. 13 is a schematic diagram illustrating a double click operation performed on the touch panel of the related art.
Figure 14:
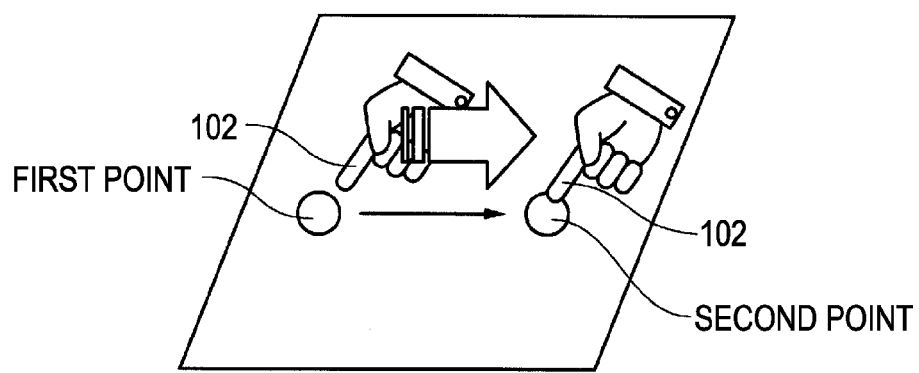
FIG. 14 is a schematic diagram illustrating a slide operation performed on the touch panel of the related art.

In this touch panel, some of the pulse lines $P_1$ to $P_n$ have widths different from those of the other pulse lines. For example, in the example shown in FIG. 10, two pulse lines $P_1$ and $P_6$ located at the respective ends of the pulse lines $P_1$ to $P_6$ each have the width twice the width of the other pulse lines $P_2$, $P_3$, $P_4$, and $P_5$. Otherwise, the touch panel of the sixth embodiment is identical to that of the first embodiment.

According to the sixth embodiment, effects similar to those in the first embodiment can be obtained. In addition, a touch can be detected more easily on the pulse lines $P_1$ and $P_6$ which are wider than the other lines among the pulse lines $P_1$ to $P_6$, i.e., at the respective ends of the touch panel in the direction in which the pulse lines $P_1$ to $P_6$ are arranged.

A touch panel according to a seventh embodiment of the present invention will now be described.

In the touch panel in the first embodiment, in the half mode, pulses are applied to every other line of the pulse lines $P_1$ to $P_n$ in turn. In comparison, in the touch panel of the seventh embodiment, in the half mode, pulses may be applied alternately to one of the pulse lines on one side and one of the other pulse lines on the other side with reference to the center in the arrangement direction of the pulse lines $P_1$ to $P_n$, so that the pulse line applied with the pulse is changed gradually from the center to the both ends in the arrangement direction of the pulse lines $P_1$ to $P_n$. For example, in the case where there are ten pulse lines $P_1$ to $P_{10}$ as shown in FIG. 8A, the pulses are applied to the pulse lines $P_5$, $P_7$, $P_3$, $P_9$, and $P_1$ in this order. Otherwise, the touch panel of the seventh embodiment is identical to that of the first embodiment.

According to the seventh embodiment, effects similar to those in the first embodiment can be obtained.

The present application contains subject matter related to that disclosed in Japanese Priority Patent Application JP 2008-199254 filed in the Japan Patent Office on Aug. 1, 2008, the entire content of which is hereby incorporated by reference.

While the specific embodiments of the present invention have been described above, it should be understood that the present invention is not restricted to the above-described embodiments; various modifications are possible based on the technical ideas of the present invention. For example, the numerical values, configurations, shapes, and arrangements described in the above embodiments are only given by way of example; other numerical values, configurations, shapes, and arrangements may be used as necessary.

What is claimed is:

1. A touch panel comprising:
   n first line electrodes to which pulses are applied, n being an integer of 2 or greater;
   m second line electrodes for use in detection, m being an integer of 2 or greater, the second line electrodes being arranged to cross the first line electrodes; and
   a pulse generating circuit configured (i) to be able to apply pulses in a selected order to $n_1$ first line electrodes selected from among the n first line electrodes, $n_1$ being an integer of at least 1 and not greater than n, and (ii) to be able to apply pulses to all of the n first line electrodes; and
   a detecting circuit,
   wherein,
      the detecting circuit is configured to detect a touched position on the touch panel by detecting a change in capacitance between one of the first line electrodes and one of the second line electrodes,
      the touch panel is configured to be switched between a first mode in which the pulses are applied in the selected order to the selected $n_1$ first line electrodes, where $1 \leq n_1 < n$, and a second mode in which the pulses are applied to all of the n first line electrodes,
      the touch panel operates in the first mode during standby, and
      the touch panel is switched from the first mode to the second mode at least when a touch is detected once within a predetermined time limit and a duration of the touch exceeds the predetermined time limit.

2. The touch panel according to claim 1, wherein $n_1 = n/2$.

3. The touch panel according to claim 1, wherein
   while the touch panel operates in the first mode, when a first touch is detected and thereafter a second touch is detected within the predetermined time limit, and if a position touched first and a position touched second are approximately same, the touch panel is configured to recognize that a double click operation has been performed.

4. The touch panel according to claim 1, wherein
while the touch panel operates in the first mode, when a first touch is detected and thereafter a second touch is detected within the predetermined time limit, and if a position touched first and a position touched second are relatively distant from each other, the touch panel is configured to recognize that a slide operation has been performed.

5. The touch panel according to claim 1, wherein
while the touch panel operates in the first mode, when the touch is detected once within the predetermined time limit and the duration of the touch does not exceed the predetermined time limit, the touch panel is configured to recognize that a single click operation has been performed.

6. The touch panel according to claim 1, wherein
the touch panel is switched from the first mode to the second mode to process a drag operation.

7. The touch panel according to claim 1, wherein in the first mode, the pulses are applied to the selected $n_1$ first line electrodes in the order in which the first line electrodes are arranged.

8. The touch panel according to claim 1, wherein in the first mode, the pulses are applied to the selected $n_1$ first line electrodes in such a manner that the pulses are applied to every given ordinal number of first line electrodes.

9. The touch panel according to claim 1, wherein in the first mode, the pulses are applied to the selected $n_1$ first line electrodes in such a manner that the pulses are applied to respective groups of plural first line electrodes.

10. The touch panel according to claim 1, wherein in the first mode, the pulses are applied in the selected order to a first plurality of selected $n_1$ first line electrodes during a first line scan, and then the pulses are applied in the selected order to a second plurality of selected $n_1$ first line electrodes during a subsequent line scan, where a start line electrode $n_1$ in the second plurality of selected $n_1$ first line electrodes to which a pulse is first applied during the subsequent line scan is made to be different from a start line electrode $n_1$ in the first plurality of selected $n_1$ first line electrodes to which a pulse is first applied during the first line scan.

11. The touch panel according to claim 1, wherein the n first line electrodes are arranged at equal spacings.

12. The touch panel according to claim 1, wherein the n first line electrodes have equal widths.

13. The touch panel according to claim 1, wherein the n first line electrodes vary in width.

14. The touch panel according to claim 1, wherein the m second line electrodes are arranged at equal spacings.

15. A method for operating a touch panel, the touch panel (i) including n first line electrodes to which pulses are applied, n being an integer of 2 or greater and m second line electrodes for use in detection, m being an integer of 2 or greater, the second line electrodes being arranged to cross the first line electrodes, and (ii) configured to detect a touched position on the touch panel by detecting a change in capacitance between one of the first line electrodes and one of the second line electrodes, the method comprising:
operating the touch panel in a first mode in which pulses are applied, in a selected order, to $n_1$ first line electrodes selected from among the n first line electrodes, $n_1$ being an integer of at least 1 and not greater than n; and
operating the touch panel in a second mode in which pulses are applied to all of the n first line electrodes,
wherein,
operating the touch panel in the first mode includes operating the touch panel in the first mode during standby, and
the method further comprises switching the touch panel from the first mode to the second mode at least when a touch is detected once within a predetermined time limit and a duration of the touch exceeds the predetermined time limit.

16. The method according to claim 15, wherein the touch panel is switched from the first mode to the second mode to process a drag operation.

17. An electronic apparatus comprising:
a touch panel, the touch panel including:
n first line electrodes to which pulses are applied, n being an integer of 2 or greater,
m second line electrodes for use in detection, m being an integer of 2 or greater, the second line electrodes being arranged to cross the first line electrodes, and
a pulse generating circuit configured (i) to be able to apply pulses in a selected order to $n_1$ first line electrodes selected from among the n first line electrodes, $n_1$ being an integer of at least 1 and not greater than n, and (ii) to be able to apply pulses to all of the n first line electrodes, and
a detecting circuit,
wherein,
the detecting circuit is configured to detect a touched position on the touch panel by detecting a change in capacitance between one of the first line electrodes and one of the second line electrodes,
the touch panel is configured to be switched between a first mode in which the pulses are applied in the selected order to the selected $n_1$ first line electrodes, where $1 \leq n_1 < n$, and a second mode in which the pulses are applied to all of the n first line electrodes,
the touch panel operates in the first mode during standby, and
the touch panel is switched from the first mode to the second mode at least when a touch is detected once within a predetermined time limit and a duration of the touch exceeds the predetermined time limit.

18. The apparatus according to claim 17, wherein the touch panel is switched from the first mode to the second mode to process a drag operation.

19. A method for operating an electronic apparatus including a touch panel, the touch panel (i) including n first line electrodes to which pulses are applied, n being an integer of 2 or greater and m second line electrodes for use in detection, m being an integer of 2 or greater, the second line electrodes being arranged to cross the first line electrodes, and (ii) configured to detect a touched position on the touch panel by detecting a change in capacitance between one of the first line electrodes and one of the second line electrodes, the method comprising:
operating the touch panel in a first mode in which pulses are applied, in a selected order, to $n_1$ first line electrodes selected from among the n first line electrodes, $n_1$ being an integer of at least 1 and not greater than n; and
operating the touch panel in a second mode in which pulses are applied to all of the n first line electrodes,
wherein,
operating the touch panel in the first mode includes operating the touch panel in the first mode during standby, and
the method further comprises switching the touch panel from the first mode to the second mode at least when a touch is detected once within a predetermined time limit and a duration of the touch exceeds the predetermined time limit.

20. The method according to claim 19, wherein the touch panel is switched from the first mode to the second mode to process a drag operation.

* * * * *